United States Patent [19]
Titsworth et al.

[11] Patent Number: 4,523,844
[45] Date of Patent: Jun. 18, 1985

[54] DETERMINING TOE OF REAR AND FRONT VEHICLE WHEELS

[75] Inventors: Raymond Titsworth, Conway, Ark.; Melvin H. Lill, San Jose, Calif.

[73] Assignee: FMC Corporation, Chicago, Ill.

[21] Appl. No.: 418,881

[22] Filed: Sep. 16, 1982

[51] Int. Cl.³ .................. G01B 11/26; G01B 5/24; G01C 1/00
[52] U.S. Cl. ........................ 356/152; 33/288
[58] Field of Search ............ 33/288, 203.18; 356/155, 152

[56] References Cited

U.S. PATENT DOCUMENTS

| | | | |
|---|---|---|---|
| 4,097,157 | 6/1978 | Lill | 356/152 |
| 4,106,208 | 8/1978 | Hunter | 33/288 |
| 4,130,362 | 12/1978 | Lill et al. | 356/152 |
| 4,143,970 | 3/1979 | Lill | 356/155 |
| 4,150,897 | 4/1979 | Roberts, Jr. et al. | 356/152 |
| 4,154,531 | 5/1979 | Roberts, Jr. et al. | 356/152 |
| 4,180,326 | 12/1979 | Chang | 356/152 |
| 4,239,389 | 12/1980 | Hollandsworth | 136/155 |
| 4,285,136 | 8/1981 | Ragan | 33/203 |
| 4,302,104 | 11/1981 | Hunter | 356/152 |
| 4,311,386 | 1/1982 | Coetsier | 356/155 |
| 4,330,945 | 5/1982 | Eck | 33/203.18 |
| 4,336,658 | 6/1982 | January et al. | 33/288 |
| 4,381,548 | 4/1983 | Grossman et al. | 33/288 |
| 4,383,370 | 5/1983 | Van Blerk et al. | 33/203.18 |

FOREIGN PATENT DOCUMENTS

WO81/01047 4/1981 PCT Int'l Appl.

*Primary Examiner*—S. C. Buczinski
*Attorney, Agent, or Firm*—A. J. Moore; H. M. Stanley; R. B. Megley

[57] ABSTRACT

An improved method, and apparatus for performing the method, is disclosed for measuring and correcting the individual toe of pairs of steerable and non-steerable wheels of a vehicle relative to a longitudinal centerline passing through the midpoints of the wheel pairs. The improved methods utilize aimable alignment heads which are alternately mounted on the non-steerable wheels and the steerable wheels and are sighted only once on targets on the other wheels thereby eliminating the need for resighting after each toe adjustment is made. Optical cross-toe paths of each head operate in a continuous mode and provide a running display of incremental toe angle adjustments of one wheel while the toe display value associated with the other wheel of the pair is frozen, which other wheel is not being adjusted for toe.

31 Claims, 10 Drawing Figures

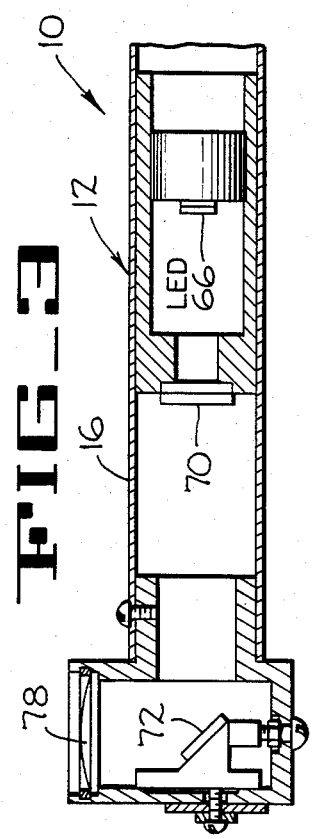
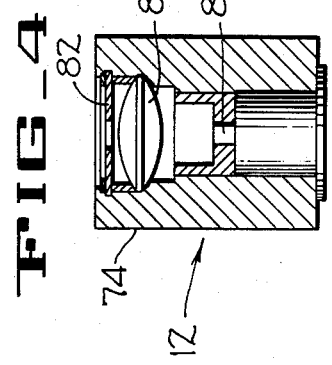
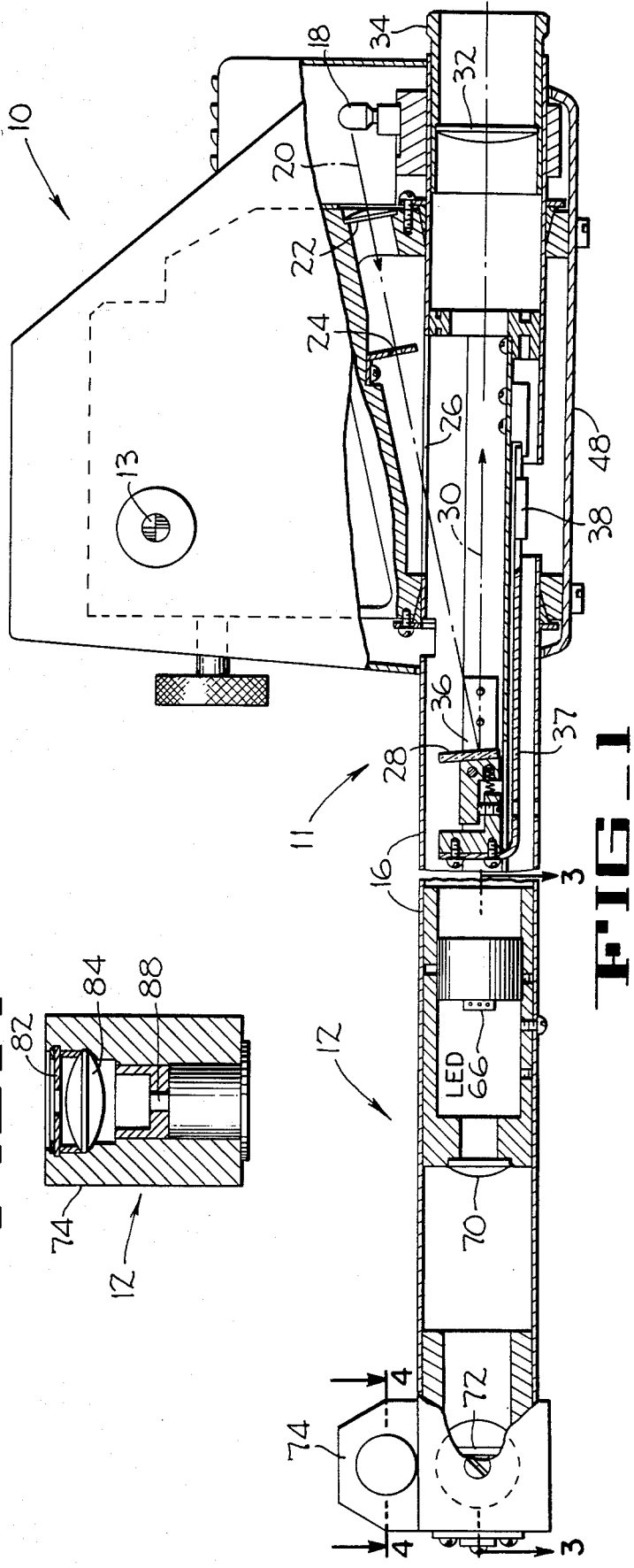

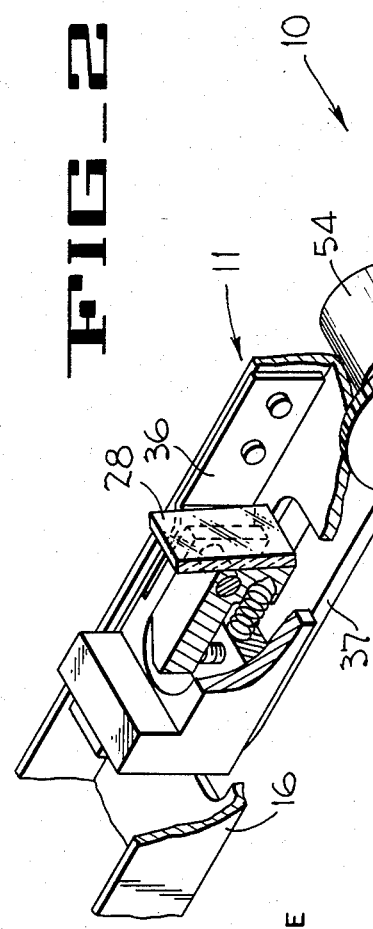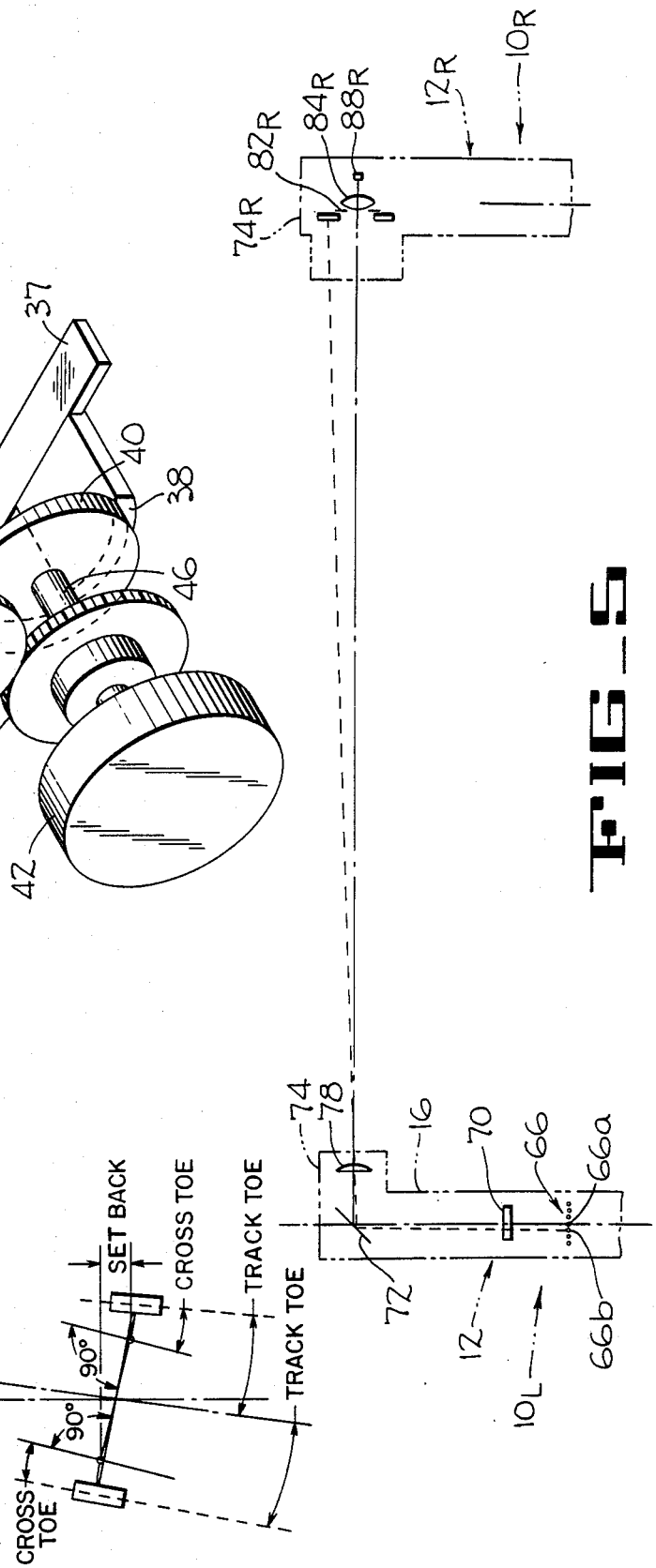

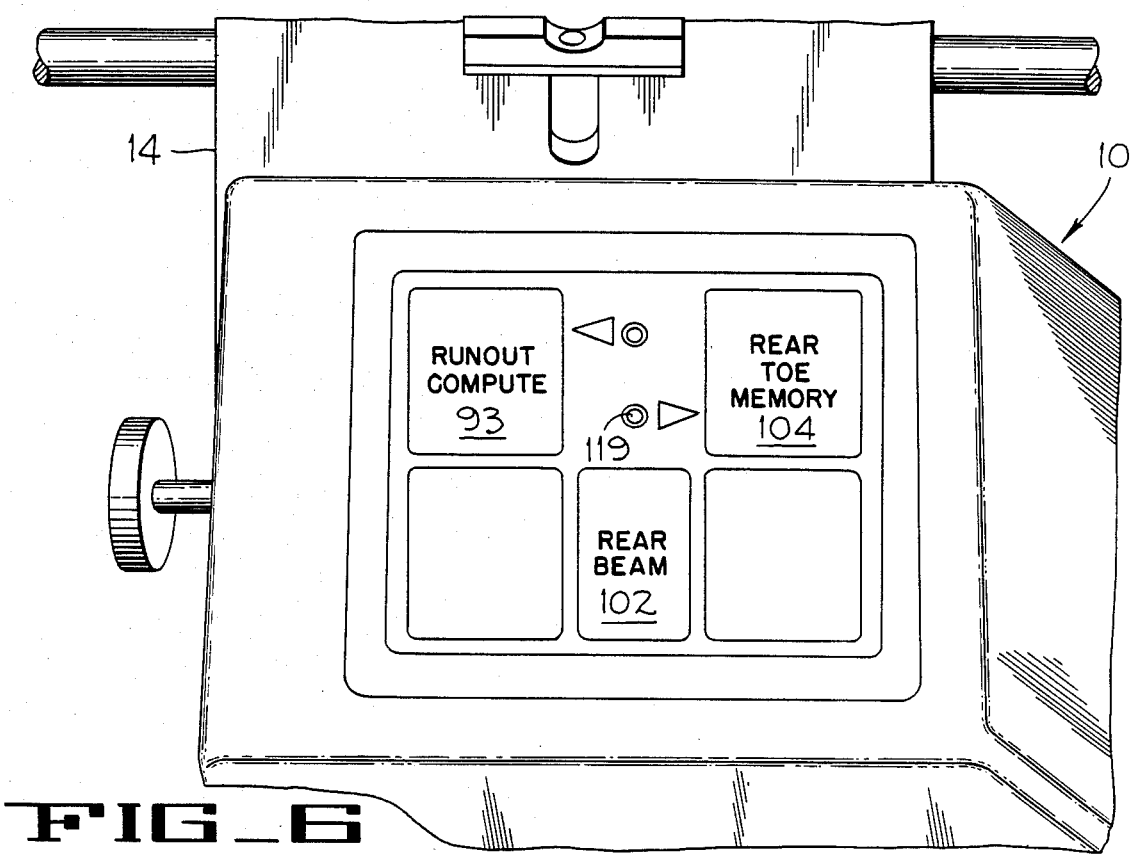
FIG_6
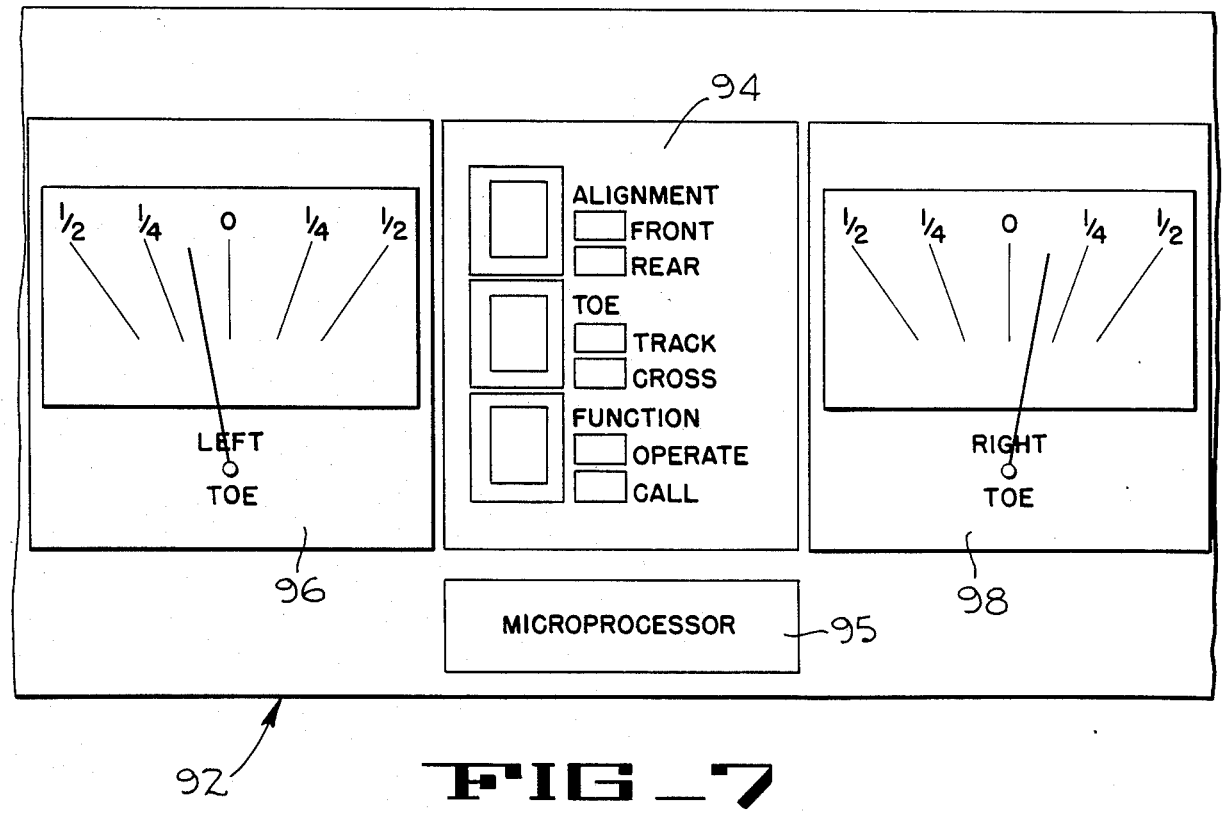
FIG_7

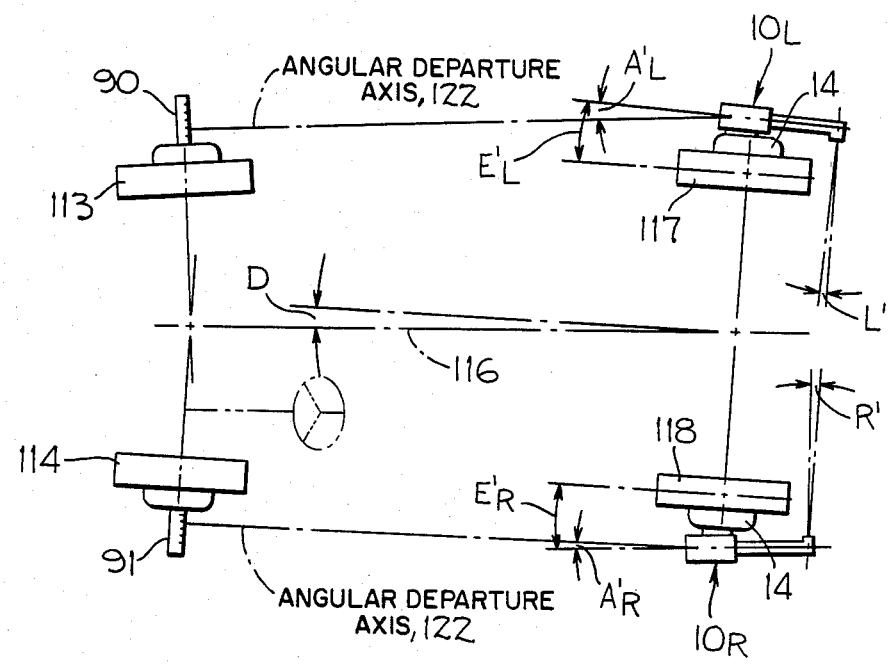
FIG_8
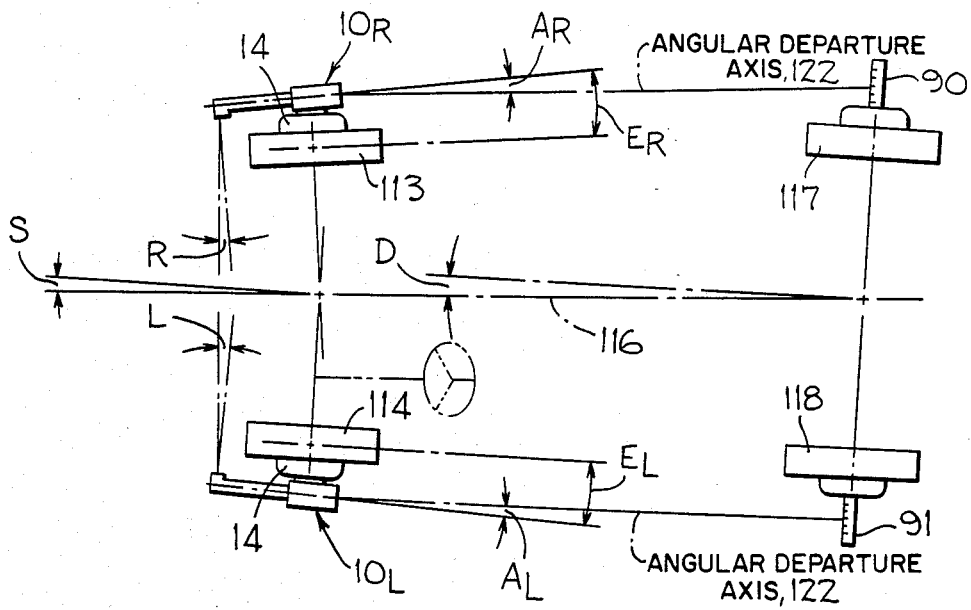
FIG_9

DETERMINING TOE OF REAR AND FRONT VEHICLE WHEELS

BACKGROUND OF THE INVENTION

1. Field of the Invention

This invention relates to automobile wheel alignment and more particularly relates to a method and apparatus of using electronic angle measuring equipment for determining the actual toe of rear and front vehicle wheels relative to the longitudinal axis of the vehicle and for indicating the corrections needed for achieving the proper toe of each wheel.

2. Description of the Prior Art

Reference is made to Lill U.S. application Ser. No. 261,445 filed May 8, 1981, now continuation application Ser. No. 540,911 filed on Oct. 12, 1983. A portion of the preferred alignment head used in performing the method herein is disclosed in Ragan U.S. application Ser. No. 261,441 which was also filed on May 8, 1981, now U.S. Pat. No. 4,408,879 which issued on Oct. 11, 1983. These applications are presently assigned to the assignee of the present invention.

Electro-optical methods and apparatus are known for determining and correcting the toe of front and/or rear wheels of a vehicle. However, when correcting the toe of rear wheels the operator is required to re-aim the line of sight after each adjustment of the rear wheels when using prior art systems thereby making the rear wheel toe alignment procedure time consuming and requiring the operator to use different alignment techniques for front and rear toe corrections. Copending Lill continuation U.S. application Ser. No. 540,911 discloses such a prior art method and apparatus and provides a pair of visual image aiming systems in the aligner heads rather than a pair of light beam projector aiming systems, which light beam projectors are the preferred embodiment used in the practice of the method of the present invention. Furthermore, the method disclosed in the Lill application does not include an electronic memory which individually stores to toe angle of one non-steerable wheel at a time while the toe of the other wheel is being corrected by an operator who observes a running display of the toe angle as corrections are being made thereby making readjustments of the line of sight unnecessary.

Ragan U.S. application Ser. No. 261,441, now U.S. Pat. No. 4,408,879 discloses a beam projector, two of which are used to project light beams longitudinally of the vehicle and are the preferred optical alignment heads used in performing the method of the present invention. Each Ragan type projector used herein also includes cross toe beam projectors and cooperating sensors of the type disclosed in U.S. Pat. No. 4,180,326 which issued to Chang on Dec. 25, 1979 and is assigned to the assignee of the present invention.

The preferred structure for mounting the alignment heads on the associated vehicle wheels is disclosed in assignee's Ragan U.S. Pat. No. 4,285,136 which issued on Aug. 25, 1981. This patent discloses a bracket which mounts the optical alignment head on a wheel so that the head will hang from the associated bracket with its longitudinal axis substantially horizontal and parallel to the plane of rotation of the wheel.

The following U.S. patents are also pertinent to the present invention:

| | | |
|---|---|---|
| 4,097,157 | Lill | June 27, 1978 |
| 4,130,362 | Lill et al | December 19, 1978 |
| 4,150,897 | Roberts, Jr et al | April 24, 1979 |
| 4,154,531 | Roberts, Jr et al | May 15, 1979 |

All of the above applications and patents are presently assigned to the assignee of the present invention and disclose prior art wheel alignment mechanisms. The disclosures of these applications and patents are incorporated by reference herein.

Other four wheel toe alignment methods and apparatus are known wherein four alignment heads, one for each wheel, must be used for obtaining readings relating to rear wheel toe. The method requires extra steps to read the position and direction of the rear wheel. For example, a mechanical change is necessary to change mirrors to targets on the rear wheels during alignment, and certain electronic controls must be actuated on the front heads or on the console when performing functions relating to the rear wheels. The four head method is also subject to accumulated errors when determining rear toe since the residual error of runout of all four wheels; and the angle reading error between the right rear wheel and right front wheel, the right front wheel and the left front wheel and the left front wheel and left rear wheel, are all incorporated when determining the corrections needed to provide the proper toe of the rear wheels.

SUMMARY OF THE INVENTION

In accordance with the present invention a method and apparatus is disclosed to determine individual toe of at least the rear wheels of the vehicle relative to the longitudinal axis of the chassis of the vehicle, and preferably also another set of wheels, normally the front or steerable wheels, relative to the actual rolling direction of the rear wheels using substantially the same operating procedure with both sets of wheels. When aligning all four wheels relative to the longitudinal axis of the vehicle, electronic components of the system include a memory and a display for the right and left wheels, which components will maintain accurate individual rear toe readings displayed while adjustments are being made and will maintain in memory an accurate value representing the rolling direction of the rear wheels to serve as a compensating value which later will be automatically applied to the toe readings when aligning the front wheels for toe.

The apparatus of the present invention includes only two alignment heads, rather than four heads, and only two precision wheel clamps for mounting the same. The two heads include manually operated controls thereon which can be manipulated to provide electrical command signals pertaining to the alignment of the associated wheels. Only two (rather than four) electric cords are used for connecting the heads to a mobile console which displays the toe readings and also includes a microprocessor with memory.

New vehicle supporting equipment is not necessary since existing pit racks with turntables on the front end only may be used to perform the method. The vehicle is first driven on the rack in one direction with a pair of wheels to be adjusted for toe being supported on the turntables. If the other pair of wheels require checking for toe, the vehicle may be driven off the rack, turned around and driven onto the rack in the opposite direction with the other set of wheels supported by the turntables. Alternately, the vehicle may be driven onto the rack with the front wheels supported by the turntables and the rear wheels supported by slip plates so that the four wheels may be adjusted before removing the vehicle from the rack. Thus, the cost of the alignment equipment and vehicle supporting equipment is at a minimum.

The accuracy of rear toe alignment is very high when using the apparatus of the present invention since total rear toe is always read directly between the rear wheels rather than accumulating readings and errors from readings relating to the front wheels as well as the rear wheels.

The time required for training new personnel to operate the equipment is minimized since the same equipment is used on the front and rear wheels, and since substantially the same sequence of operation is performed on the front wheels and the rear wheels. Also, if the vehicle is involved in an accident and if only one rear wheel needs to be adjusted, the procedure is shortened since the display associated with the other rear wheel will indicate that that wheel is in correct toe alignment, and the required corrections to said one wheel will be indicated separately as a running display while the display associated with said other wheel remains constant. Furthermore, the procedure automatically compensates for rear axle rolling direction when total rear toe correction is not required and front wheels are adjusted to center the steering wheel.

BRIEF DESCRIPTION OF THE DRAWINGS

FIG. 1 is an elevation of an optical aligner head of the preferred aimable light beam projector type, certain parts being cut away to illustrate in vertical central section internal components of the head.

FIG. 2 is a perspective of the components of the head for simultaneously adjusting the rotary potentiometer and a mirror for varying an electrical signal and the direction of the projector light beam.

FIG. 3 is a horizontal central section taken along lines 3—3 of FIG. 1 through the cross toe beam sending portion of one of the optical heads used in the method of the present invention.

FIG. 4 is a section taken along lines 4—4 of FIG. 1 illustrating the detector of the cross beam portion of the head of FIG. 3 which receives the light beam from the opposite head.

FIG. 5 is a schematic plan illustrating two light beams of the cross beam portion of the heads with the beam being projected from the sending portion of one head and being received by the receiving portion of the opposite head.

FIG. 6 is an enlarged perspective of a portion of one of the alignment heads and wheel mounting bracket illustrating several touch sensitive switches which are actuated by an operator when aligning vehicle wheels for toe.

FIG. 7 is an enlarged elevation of a portion of a portable console illustrating left toe and right toe display meters and toe alignment mode switches which are mounted on the console and used by the operator when aligning the vehicle wheels.

FIG. 7A is a diagrammatic plan view illustrating angles relating to certain terms used in the specification.

FIG. 8 is a diagrammatic plan view, with angles exaggerated, illustrating the method utilized to measure individual non-steerable wheel toe relative to a vehicle chassis center line.

FIG. 9 is a diagrammatic plan view, with angles exaggerated, illustrating the method utilized to measure individual steerable wheel toe relative to the non-steerable wheel average rolling direction.

DESCRIPTION OF THE PREFERRED EMBODIMENT

An optical aimable wheel alignment head 10 is illustrated in FIGS. 1–4 and is the preferred head used when performing the method of the present invention. The head 10 is of the aimable light beam projector type which includes a first portion 11 which aims a light beam longitudinally of the vehicle when in operation, and a cross toe portion 12 which projects other beams transversely of the vehicles longitudinal axis. The first portion 11 of the head 10 is identical to the head disclosed in the aforementioned Ragan application except for certain electrical command controls. Accordingly, only the components of the head 10 which are essential to an understanding of the method of the present invention will be described herein. If a more detailed description of the head is desired, reference may be had to the Ragan application.

The longitudinal first portion 11 of the aimable beam head 10 when in operative position, is pivotally connected by a shaft 13 to a well known wheel mounting bracket 14 (FIGS. 6, 8 and 9) preferably of the type disclosed in the aforementioned Ragan U.S. Pat. No. 4,285,136 so that the axis of the shaft 13 is substantially concentric with the axis of the associated wheel. When so mounted, the longitudinal axis of the tube 16 is disposed substantially horizontal and parallel to the plane of rotation of the associated wheel.

A tungsten-halogen lamp 18 (FIG. 1) is placed externally of the tube 16 and when energized directs a primary light beam 20 through a condensing lens 22, a small reticle window 24, and a slot 26 in the tube 16 for reflecting off a mirror or reflector 28. The reflector 28 is angled relative to a vertical plane transverse of the tube so that a reflected horizontal light beam 30 is directed rearwardly (to the right in FIG. 1) outwardly of the tube 16 through a projection lens 32 secured in a sleeve 34 that is adjustable axially of the tube so as to focus the image of the reticle window 24 on a target as will be described later.

The reflector 28 is adjustably mounted in the tube 16 by a leaf spring 36 and support member 37 which includes a cam follower 38 (FIG. 2). A barrel cam 40, an adjustment knob 42, and a gear 44 are secured to a shaft 46 which is rotatably supported by the frame 48 (FIG. 1) of the aimable head 10. The shaft 46 is positioned so that the leaf spring 36 urges the cam follower 38 against the cam 40 and shifts the reflecting plane of reflector 28 about a generally vertical axis upon rotation of the knob 42. Thus, actuation of the knob 42 will cause the reflected light beam 30 to pivot in a horizontal plane to the right or left of the longitudinal axis of the tube 16 thereby defining an angular departure axis. Adjustment of the knob 42 will also rotate a shaft 52 of a potentiometer 54 by means of meshing engagement between a potentiometer gear 56 and the gear 44. The potentiometer is mounted on the frame 48 (FIG. 1) and the potentiometer output is preferably set at 0 when the knob 42 is adjusted to direct the reflected light beam along the longitudinal axis of the tube 16. Thus, turning the knob 42 will provide an output from the potentiometer which has a predetermined scale factor depending upon the excitation voltage of the potentiometer. Therefore, a signal indicative of the horizontal angular variation of the reference beam 30, relative to the longitudinal centerline of the tube 16 is provided by the potentiometer 54. The horizontal or departure angle of deflection of the reflected beam may be up to plus or minus about 5° relative to the longitudinal axis of the tube in a toe plane which is substantially horizontal.

Since the two heads 10 used in performing the method of the present invention are identical (except for the direction of the cross toe portions), the components of both heads will be identified by the same numerals. However, since the cross toe portion of one head receives the cross beam from the other head, the letters R and L will be added after the numerals in FIGS. 5, 8 and 9 to identify the location of the heads when mounted on the front (steerable) wheels 113,114 (FIG. 9) of the vehicle. As will be made apparent hereinafter, the heads are shifted to the opposite sides of the vehicle when mounted on the rear (non-steerable) wheels as indicated in FIG. 8.

The cross toe portion of each optical aimable alignment head 10 is illustrated in FIGS. 1, 3, 4 and 5. Since the cross toe portion 12 of each head 10 is the same as that disclosed in the aforementioned Chang U.S. Pat. No. 4,180,326, only the basic components of the cross toe portions of the heads 10 and their operation will be described herein. Reference may be had to the Chang patent for a more detailed discussion of the cross toe components of the head 10.

As shown in FIGS. 1 and 3, the tube 16 of each head 10 supports an LED array 66 which includes a plurality of instantaneously energized light sources (diodes) with only one source in each head being energized at a time. The diodes $66a, 66b$ of the LED array 66 (FIG. 5) project light beams through a lens 70 and against the mirror 72 which directs the beams transversely outward from the longitudinal axis of the tube 16 toward the receiving portions $74_R$ of the other head. The beam from the mirror 72 passes through a projection lens 78. The narrow beam from each sequentially energized diode 66 remains narrow as it passes to the receiving portion $74_R$ of the other projector $10_R$. Also, as shown in FIG. 5 only the beam from diode $66a$ passes through a narrow vertical slit aperture of a mask $82_R$, lens $84_R$, and into the detector $88_R$ of the cross toe portion $12_R$ of the other or right projector $10_R$. The beams from the other progressively energized diodes fan outwardly away from the detector $88_R$ as indicated by the light beam of diode $66b$ which is illustrated in dotted lines in FIG. 5. In FIG. 4, the receiving portion 74 of the head is illustrated at a larger scale and includes the mask 82, lens 84 and the detector 88. These components of the receiving portion 74 are disposed above the associated mirror 72 in the head 10 as best shown in FIG. 1.

For ease in explanation it will be assumed that only the light beam from diode $66a$ (FIG. 5) in the left head $10_L$ strikes the detector $88_R$ (when the wheels are at the toe angle illustrated in FIG. 5) thus the light beam from diode $66a$ activates the detector $88_R$ and generates a signal which will be used to determine the toe angle of the right wheel.

Both heads $10_L$ and $10_R$ have equivalent cross toe components which operate as described above, and accordingly a toe value for each wheel may be displayed and placed in memory. If a more detailed description of the cross toe portion 12 of the heads $10_L$ and $10_R$ is desired, reference may be had to the aforementioned Chang U.S. Pat. No. 4,180,326.

It is believed that the definition of certain terms, and a general discussion of the procedure followed by an operator when aligning all four wheels of a vehicle would be helpful before describing the optical, electrical, and computer functions of the method and apparatus of the present invention.

DEFINITION OF TERMS

With the aid of FIG. 7A, certain toe alignment terms will be made apparent and will be defined.

Individual toe is defined as the angle between the rolling plane of the wheel being checked and a longitudinal reference line of the chassis, which reference line may be a line drawn through the midpoints between the wheel pairs and is the centerline of the chassis.

Toe-in is considered as converging toward the centerline in front of the vehicle. Algebraically, toe-in is considered positive and toe-out is considered negative.

Average rear wheel rolling direction relates to an angle between the centerline of the chassis and the bisector of the angle between the planes of the rear wheel pair.

Cross toe is defined as a value of toe-in or toe-out of a vehicle wheel measured as a departure of the wheel plane from perpendicular to the line through the mounting centers of the subject wheel and its opposed wheel on the other side of the vehicle.

Track toe is defined as a value of toe-in and toe-out of a non-steerable vehicle wheel measured as a departure from parallel to the direction of travel of the vehicle when driven straight ahead on a level surface.

Total toe is defined as the algebraic sum of individual toe-in or toe-out values of an opposed pair of vehicle wheels. Total toe is also the included angle between the planes of an opposed pair of vehicle wheels. Total toe measurement is meaningful between steerable wheels only when the wheels are steered close to the straight ahead position.

The term "set back" is used to indicate that one wheel of a wheel pair rotates about an axis that is rearward of the axis of rotation of the other wheel in the pair as illustrated by the rear wheels in FIG. 7A.

A mounting error known as runout is usually present when an alignment head is mounted on a vehicle wheel and may best be defined in conjunction with FIGS. 8 and 9. The alignment head utilized herein may have runout compensation structure included therein such as that disclosed in U.S. Pat. No. 4,180,915, Lill et al, issued Jan. 1, 1980; U.S. Pat. No. 4,192,074, Chang, issued Mar. 11, 1980; or U.S. Pat. 4,138,825, Pelta, issued Feb. 13, 1979. Such a runout angle for a particular rotational position of the right non-steerable and steerable wheels 117 and 113 is shown as $E'_R$ and $E_R$ and for the left non-steerable and steerable wheels 118 and 114 as $E'_L$ and $E_L$. Runout compensation values in accordance with the runout angles may be stored in a microprocessor 95 (FIG. 7) which is operably associated with the alignment heads $10_R$ and $10_L$ so that the departure angle signals generated by the directional controls in the light beam projecting system mounted on each wheel may be corrected to bring the "home" position for each system effectively precisely parallel to the plane of its associated wheel.

OPERATORS FOUR WHEEL TOE ALIGNMENT PROCEDURE

The general procedure followed by an operator when aligning all four wheels will now be described.

During rear wheel toe alignment the operator mounts a wheel mounting bracket 14 and an alignment head 10 to each rear wheel, and preferably mounts scaled targets 90,91 (FIG. 8) on the front wheels. The operator connects a portable console 92 to a source of electrical power and then sets the three console switches 94 (FIG. 7) to "Rear Align", "Track Toe", and "Operate".

The operator then compensates for rear wheel runout in a conventional manner by jacking up each rear wheel, rotating each rear wheel, leveling each head 10 at the three wheel positions, pressing the "Runout Switch" 93 (FIG. 6) at each location, and thereafter lowering each rear wheel onto the supporting surface without allowing the wheel to rotate from the third position. The runout compensation for each rear wheel is stored in the memory of a microprocessor 95, which microprocessor is preferably a Model 6802 manufactured by Motorola. The microprocessor is preferably mounted on the portable console 92.

Total rear toe is observed by summing the readings on a left toe display meter 96 and a right display meter 98, and is converted to total rear toe by the microprocessor. Individual rear toe measurements are initiated by actuating a "Rear Beam" switch 102 (FIG. 6) which turns on the tungsten-halogen lamp 18 (FIG. 1) in one of the heads 10, preferably the head 10L on the right rear wheel 117 (FIG. 8). The light beam is then properly focused and leveled, and the knob 42 (FIG. 2) is turned to aim the light beam on the nearest convenient number on the target 90 mounted on the front wheel on the same side (right) of the vehicle. Turning the knob 42 also rotates the potentiometer shaft 52 thereby providing an electrical signal to the microprocessor. This portion of the rear toe measurement procedure is then repeated on the other (left) side of the vehicle, including focusing and directing the horizontal or rear beam from head $10_R$ onto the target 91 at the same scale number thereon as the scale number on which the other light beam was focused on the target 90. Thereby, individual rear toe is caused to be displayed on the right and left toe meters 98,96 (FIG. 7). The operator then actuates a "Rear Toe Memory" switch 104 (FIG. 6) on one of the heads 10 (preferably the left rear wheel mounted head $10_R$) to provide an electrical command signal which switches the LED light indicator 119 (FIG. 6) on, freezes the toe display on the opposite display meter 98 and provides a running display on the left toe display meter 96. The operator then adjusts the toe of the left rear wheel to the desired position, while observing the changes on the left display and subsequently locks the wheel in its desired toe position. The operator then levels each head and presses "Rear Toe Memory" 104 (FIG. 6) on the other (right) head $10_L$ mounted on the right rear wheel providing an electrical command signal which initiates functions similar to those discussed above in regard to the left rear wheel mounted head. The toe on the right side is then adjusted as necessary while watching the right toe display meter 98 on the console 92, and thereafter the operator locks the right rear wheel at the desired toe.

After both rear wheels have been adjusted as above described, the compensated and adjusted rear toe signals are placed in memory by pressing the "Rear Toe Memory" switch 104 on either head. The adjacent LED light indicator 119 (FIG. 6) will be energized indicating that such a rear toe signal is placed in memory.

The alignment heads 10 are then dismounted from the rear wheels and are mounted on diagonally opposite front wheels; and the targets are removed from the front wheels and are mounted on the rear wheels as seen in FIG. 9.

The front wheel toe alignment procedure is initiated by setting the console switches 94 (FIG. 7) to "Front Align", "Track Toe" and "Operate". The rear toe memory LED 119 remains lit and indicates that a rear toe compensating value is in memory. (After the front wheels are aligned for toe, the rear toe memory may be erased by switching the console to "Rear Align" and back to "Front Align" or by turning off power to the console).

Front wheel runout is then taken for each front wheel and follows the same procedure outlined above for rear wheel runout. The runout for each front wheel is stored in the memory of the microprocessor 95.

Total front toe measurements may then be taken, if desired, by first setting the display console function switch 94 to "Cross Toe" (FIG. 7). One front wheel, preferably the left wheel, is turned until the left toe display 96 (FIG. 7) reads zero, and the total toe is read from the right toe display meter 98. Total front toe is used to determine if the substantial correction of front wheel toe is required. The console switch 94 is returned to "Track Toe" for the adjustment procedure.

The steering wheel is then positioned and clamped in place with the steering wheel spokes in the desired straight ahead position. The "Rear Beam" switch 102 (FIG. 6) of one head 10 (preferably the left head) is actuated to turn on the lamp 18 (FIG. 1). The energized lamp 18 projects a light beam which is focused and adjusted by turning the associated potentiometer shaft onto the nearest convenient scale number on the left target, thereby providing an electrical signal input to the microprocessor. This procedure is then repeated for the right side of the vehicle with the light beam focused on the same scale number on the right target as the left beam was focused on at the left target. The individual front toe measurements are displayed on the left toe and right toe display meters 96,98 thereby enabling the operator to adjust the individual front toe as required while observing the running display on the respective left and right toe meters.

Although not pertinent to the present invention and not illustrated or described herein, it will be understood that the apparatus disclosed herein also includes components which may be used to measure caster and camber of the wheels. It will also be understood that the apparatus of the present invention may be used to align only the front wheels for toe without first aligning the rear wheels.

OPTICAL AND ANGULAR RELATIONSHIPS DURING TWO WHEEL AND FOUR WHEEL ALIGNMENT

The optical angular relationships and the functions performed by the operator and the microprocessor will now be described having reference primarily to FIGS. 8 and 9.

With the foregoing procedures performed by the operator in mind, the following quantity definitions and relationships provide information identifying individual non-steerable wheel toe in relation to the vehicle chassis centerline 116 as seen in FIG. 8. It should be noted that the quantities $A'_R$ and $A'_L$ as combined and corrected here provide a quantity which is indicative of the average rear rolling direction of the non-steerable wheels 117 and 118. The quantities R' (right) and L' (left) are signals generated by the alignment heads $10_R$ and $10_L$ respectively which relate to the individual toe of the non-steerable wheels. In all cases the prime symbol (') is used to indicate data obtained when the heads are mounted on the non-steerable wheels.

---

Definitions For Rear Wheel Toe Alignment $A_L'$ = Signal value from L aimable sight (pos. = in)
$A_R'$ = Signal value from R aimable sight (pos. = in)
$L'$ = Toe signal value of L projector (pos. = in)
$R'$ = Toe signal value of R projector (pos. = in)
$E_L'$ = Runout value of L unit mounting (stored)
$E_R'$ = Runout value of R unit mounting (stored)
$L_C'$ = Sampled and stored toe signal value of L projector at rear beam turn-on or after rear beam potentiometer adjustment is completed, corrected for runout.
  $= L' - E_L'$
$R_C'$ = Sampled and stored toe signal value of R projector at rear beam turn-on or after rear beam potentiometer adjustment is completed, corrected for runout.
  $= R' - E_R'$
$S'$ = Initial average rear wheel rolling direction (pos. = CW)
$T'_{AV}$ = ½ total toe (pos. = in)

$T_L'$ = Actual toe at L projector
$T_R'$ = Actual toe at R projector $T'_{LD}$ = Individual left rear toe (display)

$T'_{RD}$ = Individual right rear toe (display)
D = Final average rear wheel rolling direction - store for use when aligning steerable wheels (pos. CW)

Compute individual rear toe by the following equations if "rear toe memory" flag is not present:

$$S' = \frac{(A_L' - E_L') - (A_R' - E_R')}{2}$$

$$T'_{AV} = \frac{L_C' + R_C'}{2}$$

$$T_L' = T'_{AV} + S' = \frac{(L_C' + R_C') + (A_L' - A_R') + (E_R' - E_L')}{2}$$

$$T_R' = T'_{AV} - S' = \frac{(L_C' + R_C') - (A_L' - A_R') - (E_R' - E_L')}{2}$$

$T'_{LD} = T_R' \times (-1)$ Display and store as $T'_{LDS}$
$T'_{RD} = T_L' \times (-1)$ Display and store as $T'_{RDS}$ $$D = \frac{T'_{LD} - T'_{RD}}{2} \text{ Store}$$

Compute individual rear toe by the following equations if "rear toe memory" flag is present:
$T'_{LD} = -[(L' - E_L') + (R' - E_R')] - T'_{RDS}$
  $= (E_L' + E_R') - (L' + R') - T'_{RDS}$
$T'_{RD} = [(L' - E_L') + (R' - E_R')] - T'_{LDS}$
  $= (E_L' + E_R') - (L' + R') - T'_{LDS}$ $$D = \frac{T'_{LD} - T'_{RD}}{2} \text{ Store}$$

---

It is noted that the average rear rolling direction is alternately identified as S' or D, and that D is given a value of zero if no rear toe data has been entered. The average rear rolling direction identified as S' is derived only from information provided by the rearwardly projecting beams 122 as indicated by the equations, whereas the average rear rolling direction identified as D is determined by the presently displayed right and left toe values which are in turn determined by information from both the longitudinal beams 122 and the cross beams from the heads $10_R$ and $10_L$.

With reference now to FIG. 8 of the drawings the pair of front steerable wheels 113 and 114 are shown together with a pair of non-steerable rear wheels 117 and 118 with the alignment heads $10_R$ and $10_L$ mounted on the non-steerable rear wheels. The alignment heads are reversed on the rear wheels in order to find clearance under the rear of the vehicle for the cross toe measurements L' and R' as shown in FIG. 8. As a result the sign of the toe signal must be changed and the values derived by the alignment head $10_L$ must be displayed on the right meter and the values derived by the alignment head $10_R$ must be displayed on the left meter because they are mounted on the right and left rear wheels respectively. The rear alignment switch on the three console switches 94 (FIG. 7) accomplishes this. The alignment switch must be selected to the position which conforms with the position at which the alignment heads are mounted, front or rear. Correction factor command switches 93 and 104 (FIG. 6) are also provided on heads $10_R$ and $10_L$ so the appropriate correction factors and average rear wheel rolling direction signal D may be stored when appropriate.

With the alignment heads $10_R$ and $10_L$ mounted on the non-steerable rear wheel pair 117 and 118, the targets 90 and 91 which are about 7 inches in length and have graduated scales thereon, are mounted at the axes of the front steerable wheels 113 and 114 respectively as shown. The portions 11 of the aimable heads $10_R$ and $10_L$ which project longitudinal beams as disclosed hereinbefore are adjusted by means of the knobs 42 (FIG. 2) so that the projected image of the reticle windows 24 appear at the same graduated points on the associated graduated target scales 90 and 91. The projected beam paths 122 are therefore directed to points which are equidistant from a point on the chassis centerline, specifically the mid-point between the front steerable wheels 113 and 114. An electrical signal is therefore generated by each potentiometer 54 in the associated alignment head $10_R, 10_L$ wherein the signals are indicative of the angles $A'_R$ and $A'_L$ as seen in FIG. 8. The runout errors $E'_R$ and $E'_L$ are obtained as hereinbefore described and together with the individual toe signal values R' and L' are input to the microprocessor 95 and are used to perform calculations in accordance with the aforementioned relationships.

It may be seen from the foregoing relationships that the quantity S' is representative of the average rolling direction relative to chassis centerline 116 of the pair of rear wheels 117 and 118 and is obtained by combining the signals which indicate the deviations of the lines of sight 122 from a direction parallel to the planes of the wheels 117 and 118. The toe value $T'_L$ is computed relative to the chassis centerline 116 by adding the average rolling direction S' for the rear wheels to a quantity $T_{AV}$ derived from the signals provided by the alignment heads equal to one half of the total toe of the rear wheels, and the toe value $T'_R$ is computed by subtracting the rear rolling direction quantity from the half total rear toe value. As was noted in previous discussions, the final computational steps account for the fact that the left projector unit is mounted on the right rear wheel with the cross projector oriented about the rear of the tire. Likewise, the right projector is mounted on the left rear wheel with the cross projector oriented about the rear of the tire.

Due to the fact that the rear suspensions differ widely among makes of vehicles it is not possible to develop a single mathematical relationship (such as is described in the aforementioned U.S. Pat. No. 4,143,970 for steerable wheels) which will maintain the desired toe measurement accuracy when incorporating incremental toe changes by accounting for the longitudinal translations of the projecting and receiving elements of the toe measuring instruments. At the same time it is operationally undesirable to resight the optical longitudinally oriented projection system 11 (FIG. 1) after each incremental toe angle change or adjustment on the vehicle.

Consequently, it is desirable to devise a method whereby the longitudinally oriented rear reference system can be initially directed to appropriate target orientations as previously described and then have the transverse measuring instruments (cross toe portions) accurately track any subsequent incremental toe angle changes. The present invention describes a method for accomplishing this goal. It has general applicability to electronic alignment machines which measure toe of any wheel pair, while being most advantageous with microprocessor based computing equipment having memory capability.

After the initial rear toe angle values are determined as hereinbefore described, the rear toe memory switch 104 (FIG. 6) is activated on one wheel mounted head which provides an electrical command signal which freezes the individual toe angle output reading of the opposite rear wheel on meter 96 or 98 (FIG. 7) and directs that subsequent changes of total toe L' plus R' as measured by the cross toe measuring system 12 be applied to the reading for the side where the switch was activated. This will yield very accurate tracking of the changes in toe angle occuring on the side being adjusted. The longitudinal displacement of the cross toe projectors and receivers has no net effect on the perceived total toe angle change since any longitudinal shift has a negative effect at one measuring instrument and an equal magnitude positive effect on the other which cancels out in the total toe calculation.

After one side has been adjusted, the rear toe memory switch 104 is now activated on the opposite measuring instrument which freezes the individual toe angle output reading of the first rear wheel and directs that subsequent changes in total toe (as measured by the cross toe measuring system) be applied to the readings for this opposite side. The calculations are performed in accordance with the preceding relationships (where the switch 104 on the left rear mounted head $10_R$ in FIG. 8 is actuated and left rear wheel toe is adjusted first).

Subsequent to obtaining the individual rear wheel toe relative to the chassis centerline 116 and the value D indicative of the average rear wheel rolling direction, the aligner heads $10_R$ and $10_L$ are removed from the left and right rear wheels 118 and 117 respectively and mounted on the right and left front steerable wheels 113 and 114 respectively as shown in FIG. 9. Once again the aimable beam projectors are aimed at a pair of points which are equidistant from a point on the vehicle centerline, preferably the midpoint between the non-steerable wheels 117 and 118. The points are identified in the diagram of FIG. 9 by directing the projection paths or lines of sight 122 to like points on the scales 90 and 91 now mounted on the axes of the non-steerable wheels 117 and 118 respectively. The aiming of the longitudinal beam projecting portions of the heads $10_R$ and $10_L$ each generates an electrical signal as hereinbefore described which is proportional to the angle between the optical axis or line of sight and the plane of the steerable wheel on which a particular alignment head $10_R$ or $10_L$ is mounted. Using this information, along with the wheel runout data, the average steering direction S of the front wheels may be obtained. In addition, electrical signals are obtained from the cross toe alignment system which are indicative of the total toe angle between the planes of the front wheels 113 and 114. Having thus obtained a signal which is indicative of the total toe between the front wheels ($T_{AV}$), a signal which is indicative of the average steering direction of the front wheels (S), and having fetched a signal from storage which is indicative of the average rear wheel rolling direction (D), a combination of the signals provides for actual front wheel toe settings $T_L$ as shown in the relationships immediately following.

Definitions For Front Wheel Toe Alignment $A_L$ = Signal value from L aimable sight (pos. = in)
$A_R$ = Signal value from R aimable sight (pos. = in)
L = Toe signal value of L projector (pos. = in)
R = Toe signal value of R projector (pos. = in)
$E_L$ = Runout value of L unit mounting (stored)
$E_R$ = Runout value of R unit mounting (stored)
$L_C$ = Sampled and stored toe signal value of L projector at rear beam turn-on or after rear beam potentiometer adjustment is completed, corrected for runout and steering geometry.
$R_C$ = Sampled and stored toe signal value of R projector at rear beam turn-on or after rear beam potentiometer adjustment is completed, corrected for runout and steering geometry.
S = Average steering $E_{of\ front\ wheels}$ (pos. = CW).
$T_{AV}$ = ½ total toe (pos. = in)
$T_L$ = Actual toe at L projector
$K_T$ = Correction factor for individual toe
$L_{CN}$ = current continuous toe signal value from L projector, corrected for runout and steering geometry.
$R_{CN}$ = Current continuous toe signal value from R projector, corrected for runout and steering geometry.
$T_{LD}$ = Individual left front toe (display).
$T_{RD}$ = Individual right front toe (display).
D = average rear wheel rolling direction (stored during rear wheel check or assigned a value of zero).

Compute individual front toe by the following equations:

$L_C = L - E_L - .25(R - L)$
$R_C = R - E_R + .25(R - L)$
$L_{CN} = L_N - E_L - .25(R_N - L_N)$
$R_{CN} = R_N - R_R + .25(R_N - L_N)$ $$S = \frac{(A_L - E_L) - (A_R - E_R)}{2}$$

$$T_{AV} = \frac{L_C + R_C}{2}$$

$$T_L = T_{AV} + S - D = \frac{(L_C + R_C) + (A_L - A_R) + (E_R - E_L)}{2} - D$$

$$K_T = L_C - T_L = \frac{(L_C - R_C) - (A_L - A_R) - (E_R - E_L)}{2} + D\ \text{Store}$$

| -continued |
| --- |
| Definitions For Front Wheel Toe Alignment |
| $T_{LD} = L_{CN} - K_T$ Display |
| $T_{RD} = R_{CN} + K_T$ Display |

It may be seen from the foregoing that a correction factor for the front steerable wheels $K_T$ may be obtained from the signals obtained from the specific set-up described immediately hereinbefore by comparing an individual toe signal from one of the alignment heads $10_R$ or $10_L$ with the computed actual toe value at that particular setting for either the left steerable wheel 113 or the right steerable wheel 114 respectively. The microprocessor is signaled to calculate a $K_T$ value by actuating the rear beam switch (102 in FIG. 6) or by making a rotational adjustment of the potentiometer (54 in FIG. 2) while the alignment switch on panel 94 (FIG. 7) is in the front position. The correction factor $K_T$ is combined with the continuous individual toe indicative signals $L_{CN}$ and $R_{CN}$ from the alignment heads to continuously obtain a corrected toe signal display while individual wheel toe is being adjusted or the steering direction is being changed. The correction factor is constant for any of the situations for FIGS. 8 and 9 described herein and may be obtained by one careful set-up of the alignment heads $10_R$ and $10_L$ and aimable longitudinal beam portion 11 contained therein. Thereafter, having stored the correction factor, no special care need be taken in adjusting individual toe of the front wheels on the vehicle to assume predetermined toe angle inclinations, while nonetheless being assured of corrected toe inclination displays.

Although the best mode contemplated for carrying out the present invention has been herein shown and described, it will be apparent that modification and variation may be made without departing from what is regarded to be the subject matter of the invention.

What is claimed is:

1. A method of measuring toe for wheels supporting a vehicle chassis wherein the wheels include at least one pair of non-steerable transversely opposed wheels, utilizing a pair of alignment heads adapted to be mounted on ones of said pair of wheels and providing a signal commensurate with the total toe angle of the wheels on which the heads are mounted, and an angle measuring system incorporated in each head including means defining an angular departure axis extending therefrom, comprising the steps of mounting an alignment head on each wheel of a non-steerable wheel pair, directing each of said axes at separate ones of a pair of points equidistant from a point on the centerline of the vehicle chassis, providing an electrical signal indicative of the angular departure of each departure axis from the plane of the non-steerable wheel on which the respective head is mounted, combining the angular departure signals with one half the total toe signal and displaying individual toe values for each of the non-steerable wheels, and providing an electrical command signal for one non-steerable wheel which causes subsequent total toe angle changes to be applied only to the toe display value of said one wheel whereby said one non-steerable wheel may be adjusted for toe and actual individual toe values continuously displayed without further reference to said departure axes.

2. A method of measuring toe for wheels supporting a vehicle chassis wherein the wheels include at least one pair of non-steerable transversely opposed wheels, utilizing a pair of alignment heads adapted to be mounted on ones of said pair of wheels and providing signals indicative of the individual toe of the wheels on which the heads are mounted, the total of said signals measuring the total toe of the pair of wheels, and an angle measuring system incorporated in each head including means defining an angular departure axis extending therefrom, comprising the steps of mounting an alignment head on each wheel of a non-steerable wheel pair, directing each of said departure axes at separate ones of a pair of points equidistant from a point on the centerline of the vehicle chassis, providing an electrical signal indicative of the angular departure of each departure axis from the plane of the non-steerable wheel on which the respective head is mounted, combining the angular departure signals with the signals indicative of individual toe and displaying actual individual toe values for each of the non-steerable wheels, and providing an electrical command signal for one non-steerable wheel which causes subsequent toe signal changes due to adjustments of said one wheel to be applied only to the toe display value of said one wheel, whereby said one non-steerable wheel may be adjusted for toe and actual individual toe values continuously displayed without further reference to said departure axes.

3. A method according to claims 1 or 2 wherein said non-steerable wheels are independently mounted wheels.

4. A method according to claim 1 and additionally comprising the step of providing another command signal for the other non-steerable wheel in said pair which causes subsequent toe signal changes to be applied only to the toe display value of said other wheel, whereby said other wheel may be adjusted for toe and actual individual toe values continuously displayed without further reference to said departure axes.

5. A method according to claim 2 and additionally comprising the step of providing another command signal for the other non-steerable wheel in said pair which causes subsequent toe signal changes to be applied only to the toe display value of said other wheel, whereby said other wheel may be adjusted for toe and actual individual toe values continuously displayed without further reference to said departure axes.

6. A method according to claim 5 and additionally comprising the steps of combining the displayed individual toe values of the non-steerable wheels to provide a corrected average rolling direction value for said pair of non-steerable wheels after adjusting non-steerable wheel toe, providing a third electrical command signal which causes the corrected average rolling direction value to be stored, removing the alignment heads from the non-steerable wheels and mounting them on the steerable wheels, directing each of said departure axes at separate ones of a pair of points equidistant from the centerline of the vehicle chassis approximately at the position of the non-steerable wheels, providing an electrical signal indicative of the angular departure of each departure axis from the plane of the steerable wheel on which the respective head is mounted, and combining the steerable wheel individual toe signals and angular departure signals with the corrected and stored non-steerable wheel average rolling direction value so that an actual toe angle value for each steerable wheel is obtained which is referenced to the corrected non-steerable wheel average rolling direction.

7. A method as in claim 6 together with the step of comparing the actual toe angle value for each steerable wheel with a respective individual toe indicative signal to obtain a steerable wheel correction factor, and storing the respective correction factors prior to making adjustments to said steerable wheels, whereby subsequent individual steerable wheel toe indicative signals measured relative to the same chassis may be corrected while individual steerable wheel toe is adjusted or the steering direction is changed.

8. A method of measuring alignment of a transversely opposed wheel pair on a wheel supported vehicle relative to the vehicle chassis centerline, comprising the steps of mounting a respective wheel alignment head containing an angle measuring system including means defining a departure axis extending therefrom on each one of the wheels of the pair, said alignment heads developing a signal commensurate with the total toe between the wheels of the pair, aiming the departure axes at respective points equidistant from a point on the chassis centerline and generally longitudinally disposed along the vehicle chassis, measuring the departure angle of each departure axis from the plane of the wheel on which mounted and providing a departure electrical signal for each wheel of the pair, combining the departure signals and the total toe signal to obtain individual toe values for respective wheels of the wheel pair relative to the chassis centerline, and providing a separate electrical command signal for each wheel of said pair with each command signal freezing the toe value for the opposite wheel and applying running changes of the total toe signal to the toe value of the near wheel in response to making toe angle adjustments of the associated wheel.

9. A method of measuring toe of vehicle wheels including pairs of non-steerable and steerable wheels comprising the steps of mounting a pair of optical alignment heads on the wheels of a pair of wheels to be aligned for providing a signal commensurate with the total toe of said pair of wheels, directing a departure axis from each alignment head to separate ones of a pair of points equally distant from the centerline of the vehicle chassis, providing an electrical signal indicative of the angular departure of each departure axis from the plane of rotation of the wheel on which the respective head is mounted, combining the angular departure signals with one half of the total toe signal to produce an individual toe value for each wheel of the pair, providing a command signal for one of said heads for applying corrective changes in total toe to the toe value of the associated wheel of said pair, and displaying the corrected toe value of said associated wheel so said one wheel can be adjusted and actual toe will be continuously displayed during adjustment without further reference to the departure axes.

10. A method according to claim 9 wherein the vehicle includes a steering wheel, and additionally comprises the step of providing a command signal for the other of said heads for applying corrective changes in total toe to the individual toe value of the other wheel of said pair, and displaying the corrected toe value of said other wheel so said other wheel can be adjusted and actual toe will be continuously displayed during adjustment without further reference to the departure axes.

11. A method according to claim 10 and additionally comprising the step of providing another electrical command signal which stores the corrected individual toe value of each wheel of said pair of non-steerable wheels in memory for future use when measuring toe of another set of wheels.

12. A method according to claim 11 and additionally comprising the steps of removing said optical alignment heads from said first mentioned pair of wheels being aligned and re-mounting said heads on steerable wheels of another pair of wheels, providing electrical signals for measuring total toe of the steerable wheels and to produce individual running toe values relative to each of said steerable wheels and individually displaying said toe values, and steering said steerable wheels until the display of one of said steerable wheels reads zero toe and the total toe is displayed on the display of the other steerable wheel.

13. A method according to claim 11 and additionally comprising the steps of removing said optical alignment heads from said first mentioned pair of wheels being aligned and re-mounting said heads on steerable wheels of another pair of wheels, centering said steering wheel and locking the steering wheel in said centered position, directing each of said departure axes from each alignment head to separate points equally distant from the centerline of the vehicle chassis, providing an electrical departure signal indicative of the angular departure of each departure axis from the plane of rotation of the steerable wheel on which the respective head is mounted and incorporating the corrected average rolling direction signal of said first pair of wheels from memory for applying corrective changes in individual steerable wheel toe displays of the associated steerable wheels so that actual steerable wheel toe will be continuously displayed during adjustment of each steerable wheel to the desired toe.

14. A method of measuring toe of vehicle wheels including a pair of non-steerable wheels and a pair of steerable wheels comprising the steps of mounting a pair of alignment heads each having means providing an angular departure axis on one pair of wheels to be aligned for providing signals indicative of the individual toe of each wheel of said one pair, directing the departure axis of each alignment head at separate ones of a pair of points equidistant from the centerline of the vehicle chassis, providing an electrical signal indicative of the angular departure of each departure axis from the plane of rotation of the wheel on which the respective head is mounted, combining the angular departure signals with the signals indicative of individual toe to produce actual individual toe values for each wheel of said one pair, and providing an electrical command signal which continuously applies actual toe angle corrective adjustments of one wheel of said one pair to the toe value of said one wheel while the wheel is being adjusted without reference to said angular departure axes.

15. A method according to claim 14 wherein the vehicle includes a steering wheel, and additionally comprising the step of:

providing a second command signal for the other wheel of said one pair which continuously applies actual toe angle corrective adjustments to the toe value of said other wheel while said other wheel is being adjusted without reference to said angular departure axes.

16. A method according to claim 15 and additionally comprising the step of providing a third electrical command signal which causes the corrected average rolling direction of said one pair of wheels to be computed and stored in memory for future use when measuring toe of another set of wheels.

17. A method according to claim 16 and additionally comprising the step of continuously displaying said toe values of each of said wheels during adjustment thereof.

18. A method according to claim 16 and additionally comprising the steps of removing said alignment heads from said one pair of wheels being aligned and remounting them on steerable wheels of another pair of wheels, providing electrical signals for measuring total toe of the steerable wheels and to produce individual running toe display values relative to each of said steerable wheels, and steering said steerable wheels until the display of one of said steerable wheels reads zero and the total toe is displayed on the display of the other steerable wheel.

19. A method according to claim 17 and additionally comprising the steps of removing said alignment heads from said first mentioned pair of wheels being aligned and remounting said heads on steerable wheels of another pair of wheels, center said steering wheel and locking the steering wheel in said centered position, directing each of said departure axes from each alignment head to separate points equally distant from the centerline of the vehicle chassis, and providing an electrical departure signal indicative of the angular departure axis from the plane of rotation of the steerable wheel on which the respective head is mounted and incorporating the corrected average rolling direction signal of said one pair of wheels from memory for applying corrective changes in individual steerable wheel toe displays of the associated steerable wheels so that actual steerable wheel toe will be continuously displayed during adjustment of each steerable wheel to the desired toe.

20. A method of measuring toe of vehicle wheels supporting a chassis with a longitudinal axis, said wheels including at least a pair of non-steerable wheels and another pair of wheels comprising the steps of mounting a pair of alignment heads each provided with means defining an angular departure axis on a pair of non-steerable wheels to be aligned for toe for providing a signal commensurate with the total toe of said pair of wheels, directing the departure axis of each alignment head at separate ones of a pair of points equidistant from the centerline of the vehicle chassis, providing an electrical signal indicative of the angular departure of each departure axis from the plane of rotation of the wheel on which the respective head is mounted, and providing a command signal which initiates computation and storage of a final rolling direction value of said pair of non-steerable wheels in relation to said longitudinal axis for future use when measuring toe of another set of wheels on the same chassis.

21. A method of measuring toe of vehicle wheels including a chassis with a longitudinal centerline that is supported by at least two pair of wheels comprising the steps of mounting a pair of alignment heads provided with angle measuring departure axes on one pair of wheels to be aligned for toe for providing signals indicative of individual toe of each wheel of said one pair of wheels, the total of said signals being commensurate with the total toe of said one pair of wheels, directing the departure axis of each alignment head at separate ones of a pair of points equidistant from the centerline of the vehicle chassis, providing an electrical signal indicative of the angular departure of each departure axis from the plane of rotation of the wheel on which the respective head is mounted and combining said toe signals and departure signals to provide a rolling direction value in relation to said centerline for said one pair of wheels, and providing a command signal which stores the average rolling direction value in memory for future use when measuring toe of another set of wheels on the same chassis.

22. A method of measuring toe of vehicle wheels supporting a chassis with a longitudinal centerline, said wheels including a pair of non-steerable wheels and a pair of steerable wheels comprising the steps of mounting a pair of alignment heads each provided with an angle measuring departure axis on a pair of non-steerable wheels to be aligned for toe for providing a signal commensurate with the total toe of said pair of wheels, directing the departure axis of each alignment head at separate ones of a pair of points equidistant from the centerline of the vehicle chassis, providing electrical signals indicative of the angular departure of each departure axis from the plane of rotation of the wheel on which the respective head is mounted and combining said departure signals with said total toe signal to produce actual individual toe values for each wheel of said pair relative to said centerline and providing a command signal for storing said actual values of individual toe in memory for future use when measuring toe of another set of wheels on the same chassis.

23. A method of measuring toe of vehicle wheels supporting a chassis with a longitudinal centerline that is supported by at least two pair of wheels comprising the steps of mounting a pair of alignment heads each provided with an angle measuring departure axis on one pair of wheels to be aligned for toe for providing signals indicative of the individual toe of each wheel of said one pair of wheels, directing the departure axis of each alignment head at separate ones of a pair of points equidistant from the centerline of the vehicle chassis, providing an electrical signal indicative of the angular departure of each axis from the plane of rotation of the wheel on which the respective head is mounted and combining said departure signals with said individual toe signals to provide actual individual toe angle values of each wheel of said one pair relative to said centerline, and providing a command signal which stores said actual values of individual toe readings for computing a correction factor for future use when measuring toe of another set of wheels on same chassis.

24. A method according to claims 1, 2 or 8 wherein each angle departure axis is an optical axis.

25. A method according to claims 9, 14, 20, 21 or 22 wherein each departure axis is an optical axis.

26. In an apparatus for measuring the toe of vehicle wheels including pairs of non-steerable and steerable wheels providing support for a classic having a longitudinal axis; said apparatus including means defining a pair of optical alignment heads having adjustable angular departure axes and adapted to be mounted on a pair of wheels when being tested for toe, and processing means for receiving and storing signals from said heads, the improvement which comprises;

means in said heads for sending signals to said processing means for enabling said processing means to compute the total toe of said pair of wheels being tested, said processing means receiving departure angle signals for computing values of actual individual toe of each of said wheels from said signals, switch means operatively connected between said heads and said processing means for providing at least first and second command signals to said processing means, said first command signal holding constant the derived toe value for a first of said pair of wheels being tested for toe and applying subsequent changes in said value of toe only to the second wheel of said pair of wheels being tested for toe for providing the individual toe of said second wheel, said computing means effective to compute an average rolling direction value relative to said horizontal axis from the values of individual toe, said switch means being actuated an additional time for providing a command signal which stores said average rolling direction in memory for later use when testing another pair of wheels for toe, said switch means including a head switch on each optical head, each head switch providing command signals for its associated head, and wherein either head switch may be actuated for providing said command signal which stores said average rolling direction in memory, and a pair of display means operatively connected to associated heads for separately providing visual toe readings indicative of the toe of the wheels upon which the associated heads are mounted in response to command signals from said heads.

27. An apparatus for measuring toe for wheels supporting a vehicle chassis wherein the wheels include at least one pair of non-steerable transversely opposed wheels, utilizing a pair of alignment heads adapted to be mounted on ones of said pair of wheels and providing a signal commensurate with the total toe angle of the wheels on which the heads are mounted, and an angle measuring system incorporated in each head including means defining an angular departure axis extending therefrom, comprising:

means for mounting an alignment head on each wheel of a non-steerable wheel pair, means for directing each of said axes at separate ones of a pair of points equidistant from a point on the centerline of the vehicle chassis, means for providing an electrical signal indicative of the angular departure of each departure axis from the plane of the non-steerable wheel on which the respective head is mounted, means for combining the angular departure signals with one half the total toe signal and displaying individual toe values for each of the non-steerable wheels, and means for providing an electrical command signal for one non-steerable wheel which causes subsequent total toe angle changes to be applied only to the toe display value of said one wheel whereby said one non-steerable wheel may be adjusted for toe and actual individual toe values continuously displayed without further reference to said departure axes.

28. An apparatus for measuring toe for wheels supporting a vehicle chassis wherein the wheels include at least one pair of non-steerable transversely opposed wheels, utilizing a pair of alignment heads adapted to be mounted on ones of said pair of wheels and providing signals indicative of the individual toe of the wheels on which the heads are mounted, the total of said signals measuring the total toe of the pair of wheels, and an angle measuring system incorporated in each head including means defining an angular departure axis extending therefrom, comprising:

means for mounting an alignment head on each wheel of a non-steerable wheel pair, means for directing each of said departure axes at separate ones of a pair of points equidistant from a point on the centerline of the vehicle chassis, means for providing an electrical signal indicative of the angular departure of each departure axis from the plane of the non-steerable wheel on which the respective head is mounted, means for combining the angular departure signals with the signals indicative of individual toe and displaying actual individual toe values for each of the non-steerable wheels, and means for providing an electrical command signal for one non-steerable wheel which causes subsequent toe signal changes due to adjustments of said one wheel to be applied only to the toe display value of said one wheel, whereby said one non-steerable wheel may be adjusted for toe and actual individual toe values continuously displayed without further reference to said departure axes.

29. An apparatus for measuring toe of vehicle wheels including pairs of non-steerable and steerable wheels comprising:

means for mounting a pair of optical alignment heads on the wheels of a pair of wheels to be aligned for providing a signal commensurate with the total toe of said pair of wheels, means for directing a departure axis from each alignment head to separate ones of a pair of points equally distant from the centerline of the vehicle chassis, means for providing an electrical signal indicative of the angular departure of each departure axis from the plane of rotation of the wheel on which the respective head is mounted, means for combining the angular departure signals with one half of the total toe signal to produce an individual toe value for each wheel of the pair, means for providing a command signal for one of said heads for applying corrective changes in total toe to the toe value of the associated wheel of said pair, and means for displaying the correct toe value of said associated wheel so said one wheel can be adjusted and actual toe will be continuously displayed during adjustment without further reference to the departure axes.

30. An apparatus for measuring toe of vehicle wheels including a chassis with a longitudinal centerline that is supported by at least two pair of wheels comprising:

means for mounting a pair of alignment heads provided with angle measuring departure axes on one pair of wheels to be aligned for toe for providing signals indicative of individual toe of each wheel of said one pair of wheels, the total of said signals being commensurate with the total toe of said one pair of wheels, means for directing the departure axis of each alignment head at separate ones of a pair of points equidistant from the centerline of the vehicle chassis, means for providing an electrical signal indicative of the angular departure of each departure axis from the plane of rotation of the wheel on which the respective head is mounted and combining said toe signals and departure signals to provide a rolling direction value in relation to said centerline for said one pair of wheels, and means for providing a command signal which stores the average rolling direction value in memory for future use when measuring toe of another set of wheels on the same chassis.

31. An apparatus for measuring toe of vehicle wheels supporting a chassis with longitudinal centerline that is supported by at least two pair of wheels comprising:

means for mounting a pair of alignment heads each provided with an angle measuring departure axis on one pair of wheels to be aligned for toe for providing signals indicative of the individual toe of each wheel of said one pair of wheels, means for directing the departure axis of each alignment head at separate ones of a pair of points equidistant from the centerline of the vehicle chassis, means for providing an electrical signal indicative of the angular departure of each axis from the plane of rotation of the wheel on which the respective head is mounted and combining said departure signals with said individual toe signals to provide actual individual toe angle values of each wheel of said one pair relative to said centerline, and means for providing a command signal which stores said actual values of individual toe readings for computing a correction factor for future use when measuring toe of another set of wheels on same chassis.

* * * * *